US012618434B2

(12) United States Patent
Narazaki et al.

(10) Patent No.: US 12,618,434 B2
(45) Date of Patent: May 5, 2026

(54) STRUT BEARING DEVICE AND VEHICLE STRUT SUSPENSION

(71) Applicant: NAKANISHI METAL WORKS CO., LTD., Osaka (JP)

(72) Inventors: Yasuhiro Narazaki, Osaka (JP); Shogo Ikeguchi, Osaka (JP); Shogo Fukada, Osaka (JP); Kohei Shibata, Osaka (JP); Hiroshi Yano, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 37 days.

(21) Appl. No.: 18/907,978

(22) Filed: Oct. 7, 2024

(65) Prior Publication Data

US 2025/0116297 A1 Apr. 10, 2025

(30) Foreign Application Priority Data

Oct. 10, 2023 (JP) ................................. 2023-175481

(51) Int. Cl.
*F16C 19/16* (2006.01)
*B60G 15/06* (2006.01)
(Continued)

(52) U.S. Cl.
CPC .......... *F16C 19/163* (2013.01); *B60G 15/068* (2013.01); *F16C 33/7886* (2013.01);
(Continued)

(58) Field of Classification Search
CPC ........ F16C 19/10; F16C 19/16; F16C 19/163; F16C 33/761; F16C 33/7886; F16C 33/80;
(Continued)

(56) References Cited

U.S. PATENT DOCUMENTS 10,753,389 B2 8/2020 Blanchard
2012/0321238 A1* 12/2012 Corbett ................... F16C 27/08
384/590
(Continued)

FOREIGN PATENT DOCUMENTS

CN 116104864 A 5/2023
DE 102007024628 A1 * 12/2007 ............ F16C 35/042
(Continued)

OTHER PUBLICATIONS

Extended European Search Report for European Patent Application No. 24205144.9 dated Apr. 14, 2025 (12 sheets).

*Primary Examiner* — Phillip A Johnson
(74) *Attorney, Agent, or Firm* — Kratz, Quintos & Hanson, LLP

(57) ABSTRACT

A first lower-case wall surface faces an axial gap. A second lower-case wall surface extends toward a radially outer side from an upper end of the first lower-case wall surface. A third lower-case wall surface extends upward from an end of the second lower-case wall surface in the radially outer side. A first upper-case wall surface faces an upper portion of the first lower-case wall surface. A second upper-case wall surface extends toward a radially inner side from an upper end of the first upper-case wall surface. A third upper-case wall surface extends upward from an end of the second upper-case wall surface in the radially inner side and faces the third lower-case wall surface.

6 Claims, 6 Drawing Sheets

(51) Int. Cl.
*F16C 33/78* (2006.01)
*F16C 33/80* (2006.01)
*F16C 35/04* (2006.01)

(52) U.S. Cl.
CPC ............ *F16C 33/80* (2013.01); *F16C 35/042*
(2013.01); *B60G 2204/418* (2013.01); *F16C 2326/05* (2013.01)

(58) Field of Classification Search
CPC .. F16C 35/042; F16C 2326/05; B60G 15/068; B60G 2204/418
See application file for complete search history.

(56) References Cited

U.S. PATENT DOCUMENTS

| | | | | |
|---|---|---|---|---|
| 2019/0277336 | A1* | 9/2019 | Sekine | B60G 15/068 |
| 2021/0222733 | A1* | 7/2021 | Blanchard | B60G 15/063 |

FOREIGN PATENT DOCUMENTS

| | | | | | |
|---|---|---|---|---|---|
| DE | 102016222055 | A1 * | 5/2018 | ........... | B60G 15/068 |
| DE | 102017208997 | A1 * | 11/2018 | ........... | F16C 33/767 |
| DE | 102020201405 | A1 * | 8/2021 | ........... | F16C 33/80 |
| FR | 2934656 | A1 * | 2/2010 | ........... | B60G 15/02 |
| FR | 3133420 | A1 | 9/2023 | | |
| WO | 2020/016347 | A1 | 1/2020 | | |

* cited by examiner

STRUT BEARING DEVICE AND VEHICLE STRUT SUSPENSION

FIELD

The present invention relates to a strut bearing device for use in a vehicle strut suspension.

BACKGROUND

There is a strut suspension including a coil spring that supports a wheel on a vehicle body and an expandable strut that is fixed to an axle, contains a shock absorber, and serves as a suspension provided with a shock absorber to absorb vertical vibrations. Strut suspensions are widely used primarily for front wheels of a passenger car.

As a strut bearing device for use in an upper portion of a strut suspension, there is a strut bearing device (see Patent Literature (PTL) 1, for example) including: an upper case that is made of a synthetic resin and holds an upper raceway ring (e.g., an upper cap 3 in PTL 1); a lower case that is made of a synthetic resin and holds a lower raceway ring (e.g., a lower cap 4 in PTL 1); an inner diameter side seal that is made of an elastomer and is provided in the lower case to be located in a radially inner side of rolling elements (e.g., an inner seal 6 in PTL 1); and an outer diameter side seal that is made of an elastomer and is located in a radially outer side of the rolling elements (e.g., an outer seal 7 in PTL 1).

CITATION LIST

Patent Literature

[PTL 1] U.S. Pat. No. 10,753,389

SUMMARY

Technical Problem

As described above, the upper and lower cases are made of a synthetic resin. In order to eliminate generation of abnormal noise and increase of torque, which are caused by contact between the upper and lower cases, axial and radial gaps with required sizes are provided between the upper and lower cases.

Furthermore, the strut bearing device is used in severe muddy-water environments where the strut bearing device directly receives muddy water on a road surface, which is splashed up by wheels. Furthermore, if a high-pressure washer is used when washing a car, the strut bearing device receives high-pressure water discharged from the high-pressure washer when washing the undercarriage.

In the strut bearing device of PTL 1, for example, when high-speed water such as muddy water enters an axial gap between the upper cap 3 and the lower cap 4 from an outer diameter side, the water rises along an outer peripheral surface of the lower cap 4 and reaches the outer seal 7 without sufficiently decelerating, causing the outer seal 7 to become wet, which may result in a decrease in sealing performance.

A purpose of the present invention is to provide a strut bearing device that can enhance an effect of decelerating high-speed water, such as muddy water, which has entered an axial gap between an upper case and a lower case, or an axial gap between the upper case and an upper spring seat from a radially outer side, before the water reaches an outer diameter side seal.

Solution to Problem

A strut bearing device according to a first aspect of the present invention is a strut bearing device that includes: a strut bearing; and an upper spring seat that is a spring support component supporting an upper end of a coil spring. The strut bearing includes an upper case, a lower case, an upper raceway ring held by the upper case, a lower raceway ring held by the lower case, rolling elements that roll between the upper raceway ring and the lower raceway ring, and a seal positioned in a radially outer side of the rolling elements. The upper spring seat is in contact with the lower case. An axial gap is present between the upper case and the upper spring seat. The upper case has a first upper-case wall surface, a second upper-case wall surface, and a third upper-case wall surface. Each of the first upper-case wall surface and the third upper-case wall surface is an inner peripheral surface of the upper case. The second upper-case wall surface is an annular surface of the upper case. The lower case has a first lower-case wall surface, a second lower-case wall surface, and a third lower-case wall surface. Each of the first lower-case wall surface and the third lower-case wall surface is an outer peripheral surface of the lower case. The second lower-case wall surface is an annular surface of the lower case. The first lower-case wall surface faces the axial gap. The second lower-case wall surface extends radially outward from an upper end of the first lower-case wall surface. The third lower-case wall surface extends upward from a radially outer end of the second lower-case wall surface. The first upper-case wall surface faces an upper portion of the first lower-case wall surface. The second upper-case wall surface extends radially inward from an upper end of the first upper-case wall surface. The third upper-case wall surface extends upward from a radially inner end of the second upper-case wall surface, and faces the third lower-case wall surface.

A strut bearing device according to a second aspect of the present invention includes an upper case; a lower case; an upper raceway ring held by the upper case; a lower raceway ring held by the lower case; rolling elements that roll between the upper raceway ring and the lower raceway ring; and a seal positioned in a radially outer side of the rolling element. The lower case is made of a synthetic resin containing a core metal, has a cylindrical portion and an annular portion extending radially outward from an upper portion of the cylindrical portion, and functions as a spring support component that supports an upper end of a coil spring. An axial gap is present between the upper case and the lower case. The upper case has a first upper-case wall surface, a second upper-case wall surface, and a third upper-case wall surface. Each of the first upper-case wall surface and the third upper-case wall surface is an inner peripheral surface of the upper case. The second upper-case wall surface is an annular surface of the upper case. The lower case has a first lower-case wall surface, a second lower-case wall surface, and a third lower-case wall surface. Each of the first lower-case wall surface and the third lower-case wall surface is an outer peripheral surface of the lower case. The second lower-case wall surface is an annular surface of the lower case. The first lower-case wall surface faces the axial gap. The second lower-case wall surface extends radially outward from an upper end of the first lower-case wall surface. The third lower-case wall surface extends upward from a radially outer end of the second lower-case wall surface. The first upper-case wall surface faces an upper portion of the first lower-case wall surface. The second upper-case wall surface extends radially inward from an upper end of the first upper-case wall surface. The third upper-case wall surface extends upward from a radially inner end of the second upper-case wall surface and faces the third lower-case wall surface.

In a strut bearing device according to a third aspect of the present invention in the strut bearing device according to the first and second aspects, at least one of an angle formed by the first lower-case wall surface and the second lower-case wall surface and an angle formed by the first upper-case wall surface and the second upper-case wall surface is an acute angle.

A vehicle strut suspension according to a fourth aspect of the present invention includes the strut bearing device according to the first aspect or the second aspect.

Advantageous Effects

According to the strut bearing device and the vehicle strut suspension of the present invention, the upper case has the first upper-case wall surface, the second upper-case wall surface, and the third upper-case wall surface. Furthermore, the lower case has the first lower-case wall surface, the second lower-case wall surface, and the third lower-case wall surface.

When high-speed water such as muddy water enters through the axial gap, the high-speed water bounces off the first lower-case wall surface, which is the outer peripheral surface of the lower case and faces the axial gap, and then hits the first upper-case wall surface, which is the inner peripheral surface of the upper case. The water flow toward the outer diameter side seal located in the radially outer side of the rolling elements hits the second upper-case wall surface, which is an annular surface, and then passes through a radial gap between the third lower-case wall surface and the third upper-case wall surface.

Accordingly, the high-speed water hits the first lower-case wall surface, which is the outer peripheral surface of the lower case and faces the axial gap, the first upper-case wall surface, which is the inner peripheral surface of the upper case, and the second upper-case wall surface, which is the annular surface. Thus, the water force is attenuated and the direction of the water flow is dispersed. Then, the water passes through the radial gap and approaches the outer diameter side seal. Therefore, the deceleration of the high-speed water such as muddy water that has entered the axial gap from the radially outer side before the water reaches the outer diameter side seal can be enhanced.

DESCRIPTION OF EMBODIMENTS

Hereinafter, embodiments according to the present invention are described with reference to the drawings.

Figure 1:
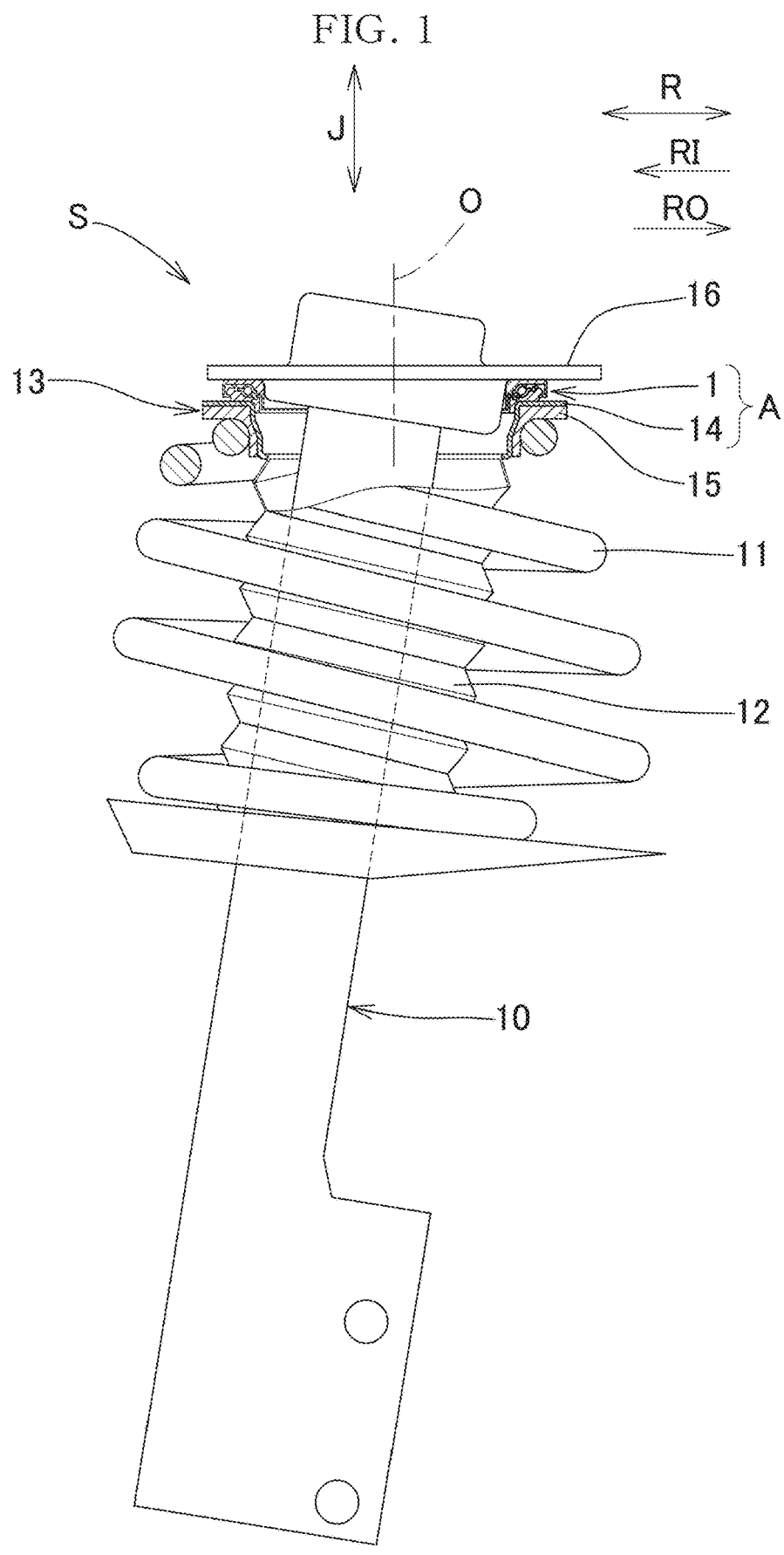
FIG. 1 is a schematic view with a partial cross-sectional view, showing a vehicle strut suspension including a strut bearing device according to Embodiment 1 of the present invention.

In the description, a direction parallel to a rotation axis O (see FIG. 1) of a strut bearing 1 is referred to as an "axial direction" (see an arrow J in FIG. 1, for example), a direction orthogonal to the rotation axis O is referred to as a "radial direction" (see an arrow R in FIG. 1, for example), a radial direction approaching the rotation axis O is referred to as a "radially inward direction" (see an arrow RI in FIG. 1, for example), and a radial direction away from the rotation axis O is referred to as a "radially outward direction" (see an arrow RO in FIG. 1, for example).

Embodiment 1

Strut Suspension

A vehicle strut suspension S shown in FIG. 1 is used while an extendable strut 10 containing a shock absorber is fixed to an axle (not shown) and an upper mount 16 is fixed to a vehicle body.

The strut suspension S is provided with, on its upper portion, a strut bearing 1 that supports the vehicle body and swings as much as a change in direction of steered wheels due to a steering operation. A swing angle of the strut bearing 1 is determined in accordance with an allowable steering angle of the wheels, and is set in a range of 40 degrees or more and 50 degrees or less, for example.

A coil spring 11 serving as a suspension spring and a dust boot 12 for protecting an oil seal of the shock absorber from foreign matters such as sand are provided on the strut 10 in a radially outer side RO. The strut suspension S includes a spring support component 13 that supports an upper end of the coil spring 11. The spring support component 13 includes an upper spring seat 14 and an upper insulator 15.

<Strut Bearing Device>

Figure 2:
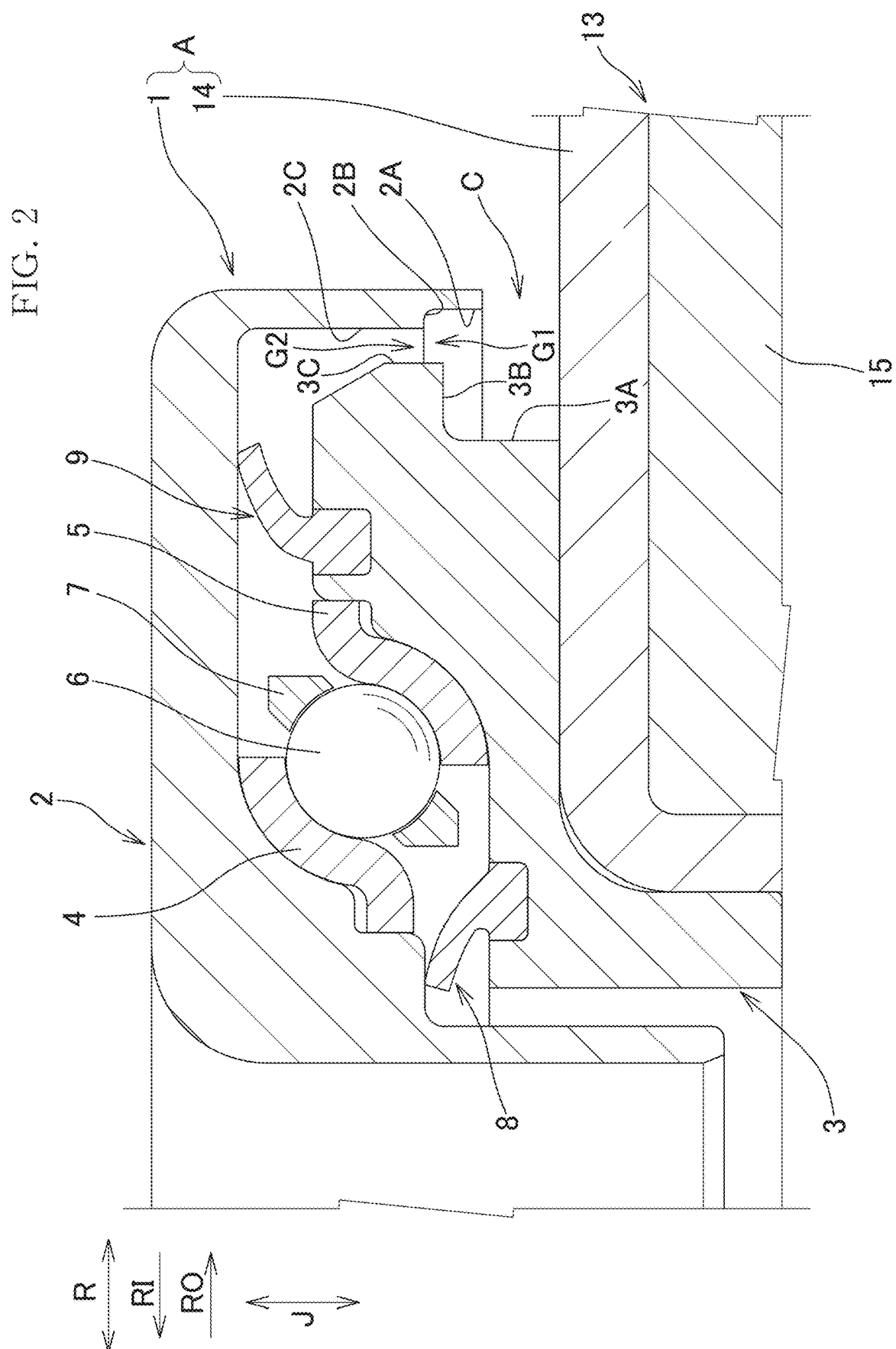
FIG. 2 is a vertical cross-sectional view of an enlarged main part of the strut bearing device and an upper insulator.

As shown in FIGS. 1 and 2, a strut bearing device A according to Embodiment 1 of the present invention includes a strut bearing 1 and an upper spring seat 14 that constitutes the spring support component 13 supporting the upper end of the coil spring 11.

The strut bearing 1 includes an upper case 2, a lower case 3, an upper raceway ring 4, a lower raceway ring 5, rolling elements 6, a retainer 7, an inner diameter side seal 8, an outer diameter side seal 9, and the like.

The upper case 2 is fixed to an upper end of the strut 10, and the lower case 3 receives the upper spring seat 14 from above. The upper raceway ring 4 is held by the upper case 2, and the lower raceway ring 5 is held by the lower case 3. The rolling elements 6 roll in a space between the upper raceway ring 4 and the lower raceway ring 5, and the retainer 7 holds the rolling elements 6 in such a manner that the adjacent rolling elements 6 do not come into contact with each other.

The inner diameter side seal 8 is located in a radially inner side RI of the rolling elements 6, and the outer diameter side seal 9 is located in the radially outer side RO of the rolling elements 6.

The upper raceway ring 4, the lower raceway ring 5, and the upper spring seat 14 are made of steel, and each formed from a steel plate through press working. The upper case 2 and the lower case 3 are made of a synthetic resin, and the inner diameter side seal 8 and the outer diameter side seal 9 are made of an elastomer.

The synthetic resin used for the upper case 2 and the lower case 3 is, for example, a polyamide-based resin (PA66, PA46, PA612, PA6, PA9T, PA10T, etc.), and contains, for example, 20 to 60% by weight of glass fiber (GF) as reinforcing fiber.

The elastomer used for the inner diameter side seal 8 and the outer diameter side seal 9 are thermoplastic elastomers (TPE), such as a styrene type elastomer (TPS), an olefin type elastomer (TPO), a urethane type elastomer (TPU), an amide type elastomer (TPA), an ester type elastomer (TPEE), etc. The rubber materials are nitrile rubber (NBR), hydrogenated nitrile rubber (HNBR), acrylic rubber (ACM), ethylene acrylic rubber (AEM), fluororubber (FKM, FPM), silicone rubber (VQM), etc. The rubber materials may be used alone, or two or more kinds of rubber may be suitably blended and used.

<Structure for Decelerating High-Speed Water that has Entered through Axial Gap>

Figure 3:
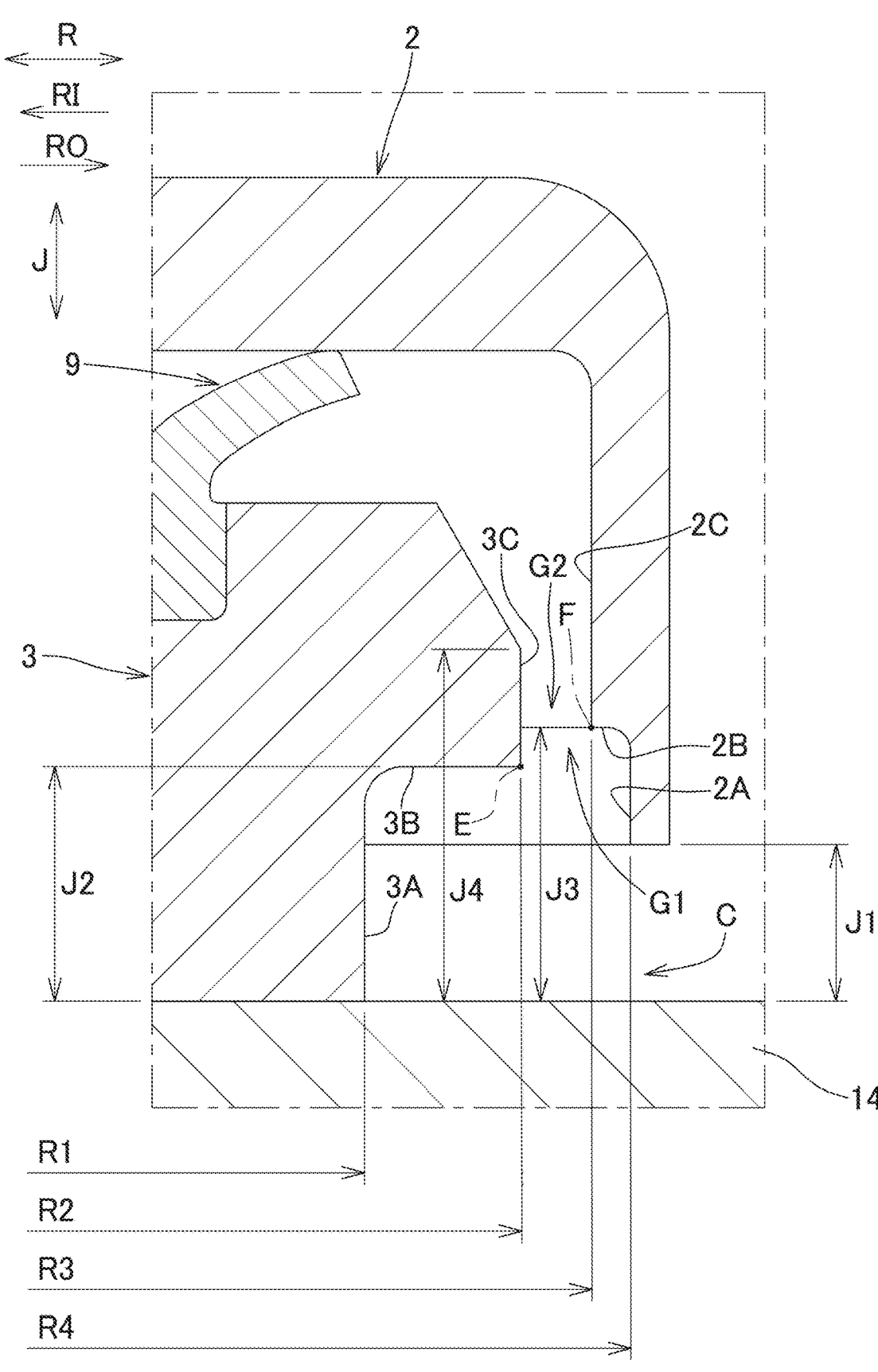
FIG. 3 is a vertical cross-sectional view of an enlarged main part of a structure around an axial gap.

As shown in FIGS. 2 and 3, an axial gap C is present between the upper case 2 and the upper spring seat 14. The upper case 2 has a first upper-case wall surface 2A, a second upper-case wall surface 2B, and a third upper-case wall surface 20. The lower case 3 has a first lower-case wall surface 3A, a second lower-case wall surface 3B, and a third lower-case wall surface 3C.

Each of the first upper-case wall surface 2A and the third upper-case wall surface 2C is an inner peripheral surface of the upper case 2. The second upper-case wall surface 2B is an annular surface of the upper case 2. Each of the first lower-case wall surface 3A and the third lower-case wall surface 3C is an outer peripheral surface of the lower case 3. The second lower-case wall surface 3B is an annular surface of the lower case.

The first lower-case wall surface 3A faces the axial gap C. The second lower-case wall surface 3B extends toward the radially outer side RO from an upper end of the first lower-case wall surface 3A. The third lower-case wall surface 3C extends upward from an end E of the second lower-case wall surface 3B in the radially outer side RO.

The first upper-case wall surface 2A faces an upper portion of the first lower-case wall surface 3A. The second upper-case wall surface 2B extends toward a radially inner side RI from an upper end of the first upper-case wall surface 2A. The third upper-case wall surface 20 extends upward from an end F of the second upper-case wall surface 2B in the radially inner side RI, and faces the third lower-case wall surface 3C.

In the examples respectively shown in FIGS. 2 and 3, the first upper-case wall surface 2A faces: the upper portion of the first lower-case wall surface 3A; the end E of the second lower-case wall surface 3B in the radially outer side RO; and a lower portion of the third lower-case wall surface 3C. In addition, the third lower-case wall surface 3C faces: a lower portion of the third upper-case wall surface 2C; the end F of the second upper-case wall surface 2B in the radially inner side RI; and an upper portion of the first upper-case wall surface 2A. Therefore, water flow toward the outer diameter side seal 9 flows from a first radial gap G1 between the third lower-case wall surface 3C and the first upper-case wall surface 2A to a second radial gap G2 that is smaller in diameter than the first radial gap G1, between the third lower-case wall surface 3C and the third upper-case wall surface 2C.

FIG. 3 shows axial lengths J1, J2, J3, and J4 that satisfy the relationship of J1<J2<J3<J4, but may also satisfy J2=J3. In other words, it is sufficient, if J1<J2≤J3<J4 is satisfied. When J2=J3, the end E of the second lower-case wall surface 3B in the radially outer side RO and the end F of the second upper-case wall surface 2B in the radially inner side RI face each other in the radial direction R.

Furthermore, FIG. 3 shows radii R1, R2, R3, and R4 that satisfy the relationship of R1<R2<R3<R4. In a preferred embodiment, the length of the second radial gap G2 in the radial direction R, i.e., R3–R2, is set to 2.0 mm or less.

Effects

When high-speed water such as muddy water enters through the axial gap C, the high-speed water bounces off the first lower-case wall surface 3A, which is the outer peripheral surface of the lower case 3 and faces the axial gap C, and then hits the first upper-case wall surface 2A, which is the inner peripheral surface of the upper case 2. The water flow toward the outer diameter side seal 9 hits the second upper-case wall surface 2B, which is the annular surface, and then passes through the second radial gap G2 between the third lower-case wall surface 3C and the third upper-case wall surface 2C.

Accordingly, the high-speed water hits the first lower-case wall surface 3A that is the outer peripheral surface of the lower case and faces the axial gap C, the first upper-case wall surface 2A that is the inner peripheral surface of the upper case 2, and the second upper-case wall surface 2B that is the annular surface. Thus, the water force is attenuated and the direction of the water flow is dispersed. Then, the high-speed water passes through the second radial gap G2 to approach the outer diameter side seal 9. Therefore, the deceleration of the high-speed water such as muddy water that has entered the axial gap C from the radially outer side RO before the water reaches the outer diameter side seal 9 can be enhanced. This makes it possible to reduce a quantity of the water flowing around a lip of the outer diameter side seal 9.

Modification

Figures 4, 5:
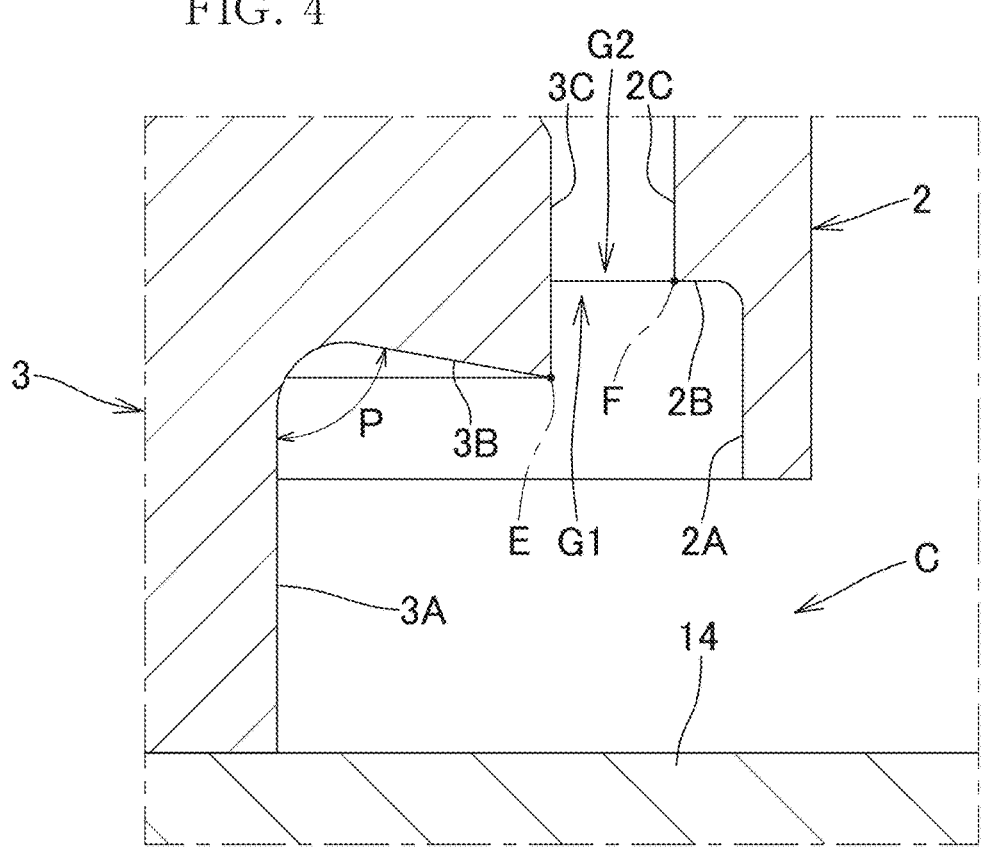
FIG. 4 is a vertical cross-sectional view of an enlarged main part of a first modified example.
FIG. 5 is a vertical cross-sectional view of an enlarged main part of a second modified example.

In a preferred embodiment, with respect to the shape shown in FIG. 3, the second lower-case wall surface 3B that is the annular surface is made to be inclined downward toward the radially outer side RO, so as to form, with the first lower-case wall surface 3A, an acute angle P (P<90 degree), as shown in FIG. 4. In a further preferred embodiment, with respect to the shape shown in FIG. 3, the second upper-case wall surface 2B that is the annular surface is made to be inclined downward toward the radially inner side RI, so as to form, with the first upper-case wall surface 2A, an acute angle Q (Q<90 degree), as shown in FIG. 5.

The angle P and/or the angle Q is formed in an acute angle, thereby further enhancing the deceleration of high-speed water such as muddy water that has entered the axial gap C from the radially outer side RO before the water reaches the outer diameter side seal 9.

Figure 6:
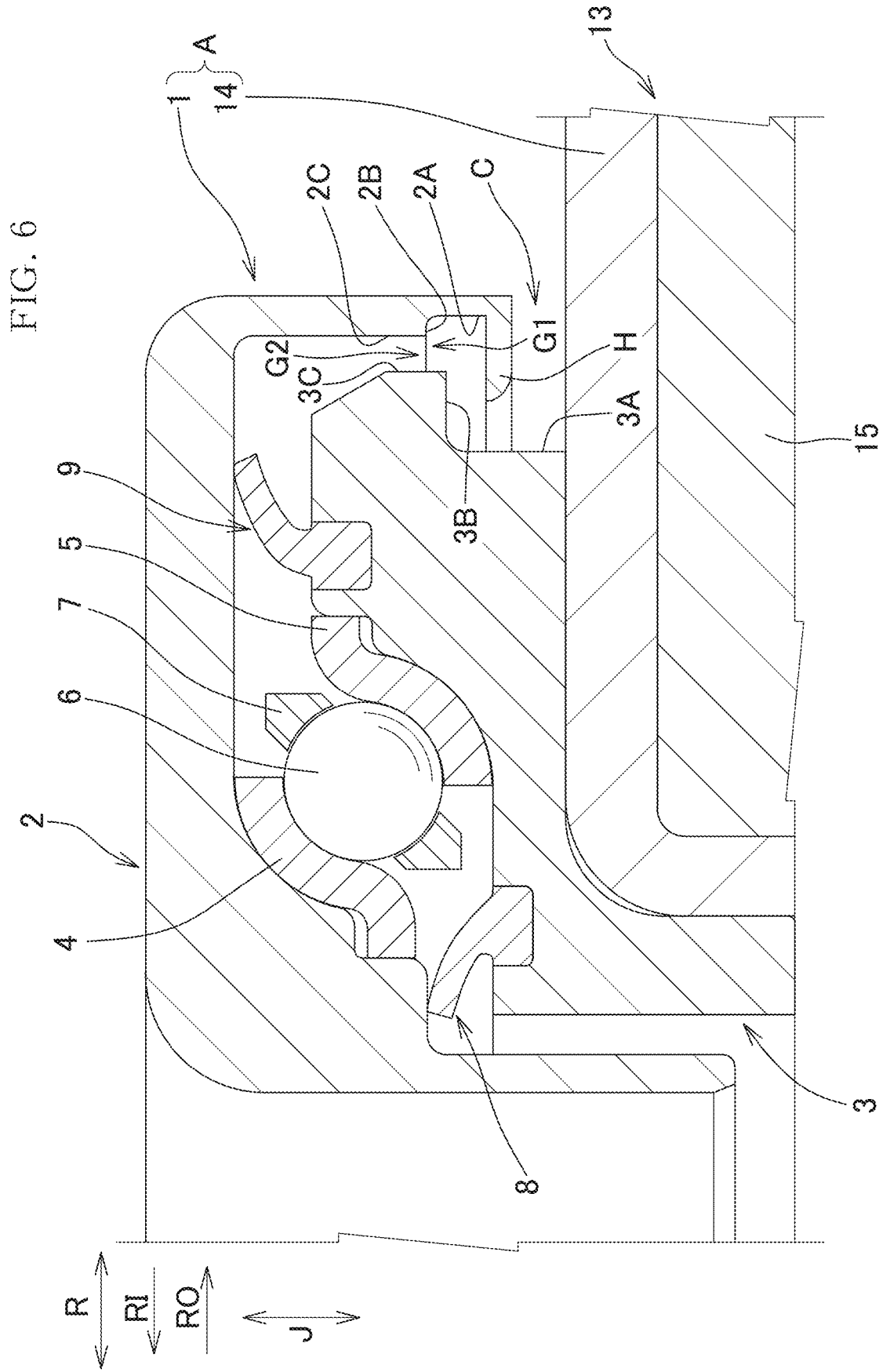
FIG. 6 is a vertical cross-sectional view of an enlarged main part of a third modified example.

For example, a lower end of the upper case 2 in the structure of FIG. 2 may be provided with an inward protruding piece H that has an annular shape and protrudes toward the radially inner side RI as shown in FIG. 6. The inward protruding piece H is provided, thereby preventing the upper case 2 and the lower case 3 from being separated.

<Analysis to Compare Flow Speeds of Entering Muddy Water, Etc.>

(Analysis Model)

An analysis model of the present invention, which imitates a shape of the strut bearing device A shown in FIG. 6, and an analysis model of a conventional shape, which imitates a shape of the strut bearing device shown in FIG. 1 of PTL 1, were prepared. In the analysis model of the present invention, the axial lengths shown in FIG. 3 satisfy J3<J4, whereas in the analysis model of the conventional shape, the axial lengths satisfy J3>J4. Flow rates of water that has entered through the axial gap C around the lip of the outer diameter side seal 9 were compared between the analysis model of the present invention and the analysis model of the conventional shape.

(Analysis Conditions)

To facilitate the analysis, an underwater environment was adopted, and an injection port (diameter: 2 mm) for injecting water was arranged on the axial gap C in the radially outer side RO to face the radially inner side RI. The analysis was performed under conditions that high-speed water with a flow rate of 8 m/s was injected from the injection port.

(Analysis Result)

The flow rate around the lip of the outer diameter side seal 9 was 0.80 for the analysis model of the present invention, in comparison with 1.0 for the analysis model of the conventional shape. Accordingly, the present invention can enhance the deceleration of the high-speed water that has entered the axial gap C before the water reaches the outer diameter side seal 9.

Embodiment 2

<Strut Bearing Device>

Figure 7:
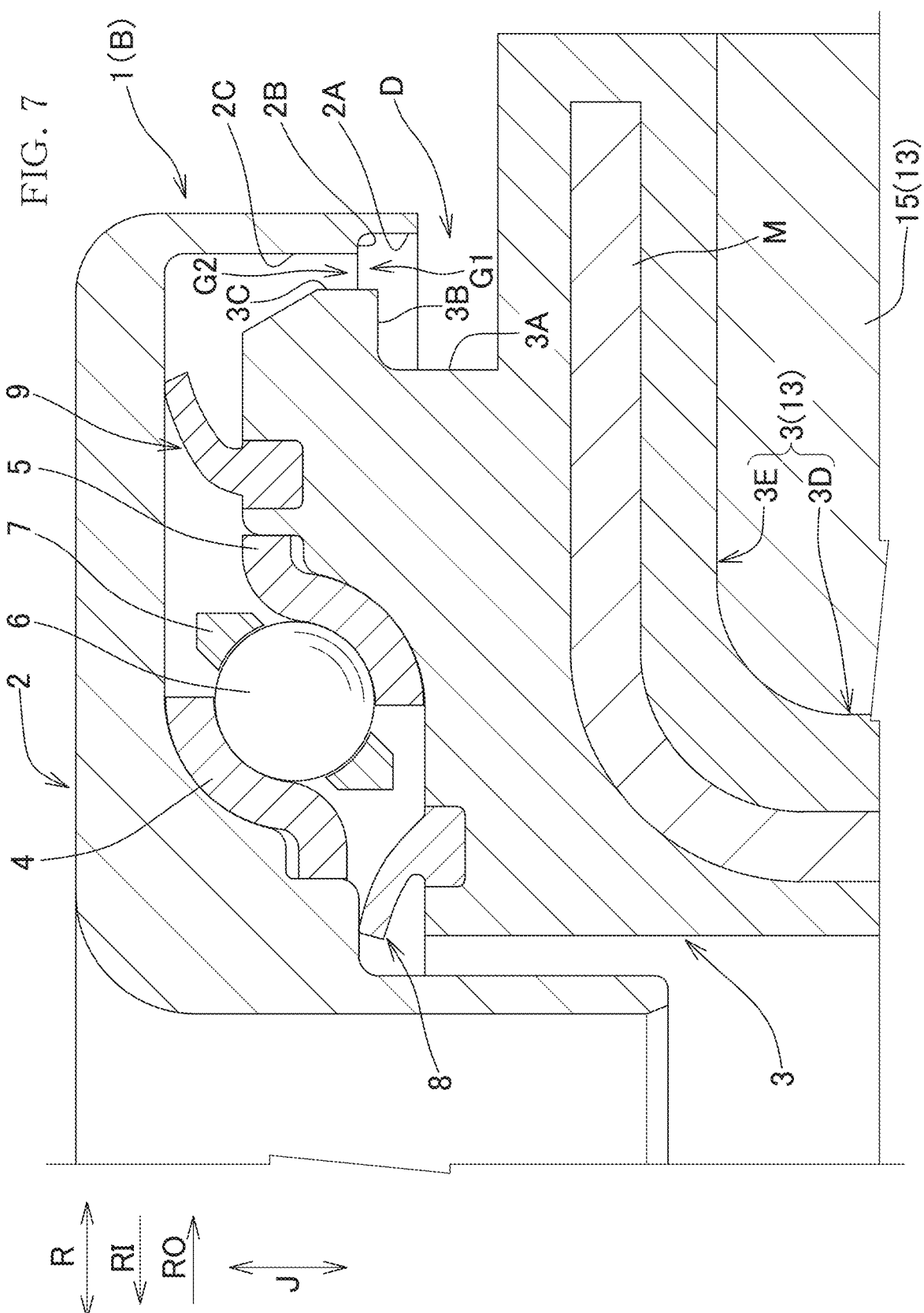
FIG. 7 is a vertical cross-sectional view of an enlarged main part of a strut bearing device according to Embodiment 2 of the present invention.

In a strut bearing device B according to Embodiment 2 of the present invention as shown in FIG. 7, the same reference numerals as those of Embodiment 1 in FIGS. 1 to 3 indicate the same or corresponding components, parts, locations, and the like.

The lower case 3 of the strut bearing 1 that is the strut bearing device B is made of a synthetic resin and contains a core metal M. The core metal M is made of steel, and is formed by pressing a steel plate. Depending on the necessity, quench-hardening is performed after the processing. The lower case 3 is formed by injection molding using the core metal M as an insert work.

The lower case 3 has a cylindrical portion 3D and an annular portion 3E extending toward the radially outer side RO from an upper part of the cylindrical portion 3D, and contains the core metal M, thereby functioning as an upper spring seat of the spring support component 13 that supports the upper end of the coil spring 11 (see FIG. 1).

There is an axial gap D between the upper case 2 and the lower case 3. The first upper-case wall surface 2A, the second upper-case wall surface 2B, and the third upper-case wall surface 2C of the upper case 2, as well as the first lower-case wall surface 3A, the second lower-case wall surface 3B, and the third lower-case wall surface 3C of the lower case 3 are the same as those in Embodiment 1. Therefore, the strut bearing device B of Embodiment 2 exhibits the same operational effects as the strut bearing device A of Embodiment 1.

The above description of Embodiments is merely illustrative and is not intended to limit the invention. Various improvements and modifications can be made without departing from the scope of the invention.

The invention claimed is:

1. A strut bearing device, comprising: a strut bearing; and an upper spring seat that is a spring support component supporting an upper end of a coil spring, wherein
   the strut bearing includes an upper case, a lower case, an upper raceway ring held by the upper case, a lower raceway ring held by the lower case, rolling elements that roll between the upper raceway ring and the lower raceway ring, and a seal positioned in a radially outer side of the rolling elements,
   the upper spring seat is in contact with the lower case,
   an axial gap is present between the upper case and the upper spring seat,
   the upper case has a first upper-case wall surface, a second upper-case wall surface, and a third upper-case wall surface,
   each of the first upper-case wall surface and the third upper-case wall surface is an inner peripheral surface of the upper case,
   the second upper-case wall surface is an annular surface of the upper case,
   the lower case has a first lower-case wall surface, a second lower-case wall surface, and a third lower-case wall surface,
   each of the first lower-case wall surface and the third lower-case wall surface is an outer peripheral surface of the lower case,
   the second lower-case wall surface is an annular surface of the lower case,
   the first lower-case wall surface faces the axial gap,
   the second lower-case wall surface extends radially outward from an upper end of the first lower-case wall surface,
   the third lower-case wall surface extends upward from a radially outer end of the second lower-case wall surface,
   the first upper-case wall surface faces an upper portion of the first lower-case wall surface,
   the second upper-case wall surface extends radially inward from an upper end of the first upper-case wall surface, and
   the third upper-case wall surface extends upward from a radially inner end of the second upper-case wall surface, and faces the third lower-case wall surface.

2. The strut bearing device according to claim 1, wherein at least one of an angle formed by the first lower-case wall surface and the second lower-case wall surface and an angle formed by the first upper-case wall surface and the second upper-case wall surface is an acute angle.

3. A vehicle strut suspension comprising the strut bearing device according to claim 1.

4. A strut bearing device comprising: an upper case; a lower case; an upper raceway ring held by the upper case; a lower raceway ring held by the lower case; rolling elements that roll between the upper raceway ring and the lower raceway ring; and a seal positioned in a radially outer side of the rolling element, wherein
   the lower case is made of a synthetic resin containing a core metal, has a cylindrical portion and an annular portion extending radially outward from an upper portion of the cylindrical portion, and functions as a spring support component that supports an upper end of a coil spring;
   an axial gap is present between the upper case and the lower case,
   the upper case has a first upper-case wall surface, a second upper-case wall surface, and a third upper-case wall surface,
   each of the first upper-case wall surface and the third upper-case wall surface is an inner peripheral surface of the upper case,
   the second upper-case wall surface is an annular surface of the upper case, the lower case has a first lower-case wall surface, a second lower-case wall surface, and a third lower-case wall surface, each of the first lower-case wall surface and the third lower-case wall surface is an outer peripheral surface of the lower case, the second lower-case wall surface is an annular surface of the lower case, the first lower-case wall surface faces the axial gap, the second lower-case wall surface extends radially outward from an upper end of the first lower-case wall surface, the third lower-case wall surface extends upward from a radially outer end of the second lower-case wall surface, the first upper-case wall surface faces an upper portion of the first lower-case wall surface, the second upper-case wall surface extends radially inward from an upper end of the first upper-case wall surface, and the third upper-case wall surface extends upward from a radially inner end of the second upper-case wall surface and faces the third lower-case wall surface.

5. The strut bearing device according to claim 4, wherein at least one of an angle formed by the first lower-case wall surface and the second lower-case wall surface and an angle formed by the first upper-case wall surface and the second upper-case wall surface is an acute angle.

6. A vehicle strut suspension comprising the strut bearing device according to claim 4.

\* \* \* \* \*